Sept. 20, 1966   C. W. BOLIEAU   3,273,337
LINEAR EXPLOSIVE TYPE IGNITER TRAIN FOR ROCKET MOTOR
Filed Sept. 30, 1963   2 Sheets-Sheet 1

INVENTOR.
CHRISTOPHER W. BOLIEAU
BY
Curtis, Morris & Safford
ATTORNEYS

Sept. 20, 1966   C. W. BOLIEAU   3,273,337
LINEAR EXPLOSIVE TYPE IGNITER TRAIN FOR ROCKET MOTOR
Filed Sept. 30, 1963   2 Sheets-Sheet 2

INVENTOR
CHRISTOPHER W. BOLIEAU
BY
Curtis, Morris & Safford
ATTORNEYS

United States Patent Office 3,273,337
Patented Sept. 20, 1966

3,273,337
LINEAR EXPLOSIVE TYPE IGNITER TRAIN
FOR ROCKET MOTOR
Christopher W. Bolieau, Brigham City, Utah, assignor to Thiokol Chemical Corporation, Bristol, Pa., a corporation of Delaware
Filed Sept. 30, 1963, Ser. No. 312,531
11 Claims. (Cl. 60—35.6)

This invention relates to rocket motor igniting systems, and more particularly to novel means for improving the operational reliability of clustered rocket motor igniting systems.

Currently, some of our largest missiles, space vehicles, and the like, utilize clustered rocket motor systems as the only means for fulfilling at least part of their propulsion requirements. Each cluster includes a group of highly reliable single rocket motors, but the overall reliability factor of the cluster is characterized by a value less than that of a single motor. The imperfect reliability factor is attributed in part to a past history of malfunctions occurring largely in single motor systems. A number of the malfunctions were associated with rocket motor igniting systems, some of which occurred in solid propellant type rocket motors. In the later cases, the igniting system frequently included electro-explosive igniters connected to an electric current source by a control switch in response to a command signal. Thus, potentialities exist for component failure which, in clustered rocket motor systems, has substantial effects on its associated missile and the like. For example, an ignition failure creates weight penalties by carrying aloft one or more un-ignited motors, reduces maximum thrust values, and introduces asymmetrical thrust forces which tend to veer the payload off course. Such incidents necessitate taking drastic corrective measure which at times result in disaster or shortened or diverted payload missions, in addition to huge wastes of manpower and materials. Thus, it has become imperative that a high degree of reliability be attained in clustered rocket motor systems.

Heretofore, several proposals have been advanced for improving the reliability of rocket motor igniting systems. For example, parallel bridge-wires and initiators have been used in electrical igniters, multiple igniters and wiring connected redundantly to a switchable current source have been incorporated in motor assemblies as have a plurality of different current sources. While each remedy attempted provided some degree of success, the measure of improvement generally varied in proportion to the remedy's degree of complexity and subsequently caused an increase in system weight which ofttimes detracted from its acceptance. Moreover, there still remained a dependency for initation on the original command signal, and at times for operation on a sole current source. Thus, the benefits derived from such improvements were in many instances out-weighed by their disadvantages and consequently the need for improving reliability still prevailed.

Accordingly, an object of the present invention is to provide an ignition system for a cluster of rocket motors having an improved overall reliability of operation.

Another object is to provide clustered rocket motors with redundant igniting means which in addition to a primary igniting system, includes a secondary igniting system of explosive devices which respond to different sources for initiation and operation than the primary system.

Another object is to provide redundant ignition for a cluster of rocket motors with a heat-initiated secondary igniting system to immediately ignite one or more motors that fail to become ignited by its primary means.

Another object is to provide redundantly ignitable clustered rocket motors with a secondary igniting system initiatable by the initial heat of combustion of any ignited motor in said cluster.

A further object is to provide redundantly ignitable clustered rocket motors with a secondary igniting system which supplies a rapid sequence of igniting impulses to motors that fail to become ignited by their primary means.

A still further object is to provide a simple, light weight highly reliable, secondary igniting system for clustered rocket motors.

Further objects and advantages of the invention will become apparent from the following description and accompanying drawing wherein like parts are referred to by like numerals and in which.

Figure 1:
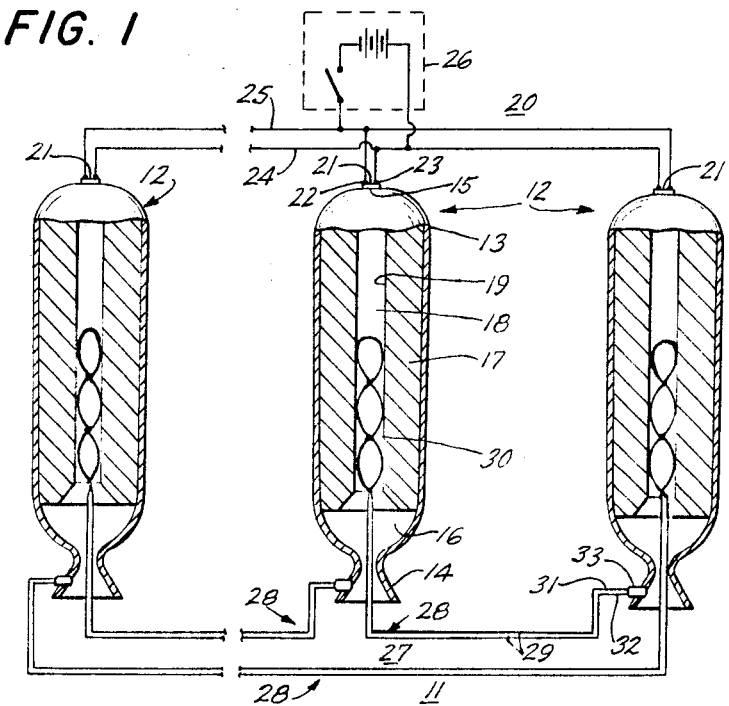
FIGURE 1 illustrates a schematic arrangement of a cluster of rocket motors, partly in section, and showing the redundant ignition means of the present invention.

Referring to the drawing, FIGURE 1 illustrates a clustered rocket motor system 11 comprised of a plurality of solid propellant rocket motors 12, interconnected by a structure not shown, and equipped with redundant igniting means. The redundant igniting means is comprised essentially of a primary igniting system 20 of electro-explosive components for normally causing the ignition of motors 12, and a secondary igniting system 27 of heat-initiated explosive components for imparting at least one igniting impulse to any motor 12 that fails to become ignited by primary system 20. The embodiment illustrated in FIGURE 1 also contemplates an alternate arrangement of clustering super-rocket motors 39 and igniting them with small rocket motors 12 positioned therein and having redundant igniting means defined by primary and secondary igniting systems 20 and 27, respectively. Super-rocket motors referred to herein are enlarged versions of those motors presently used in intercontinental ballistic missiles.

Each rocket motor 12 includes a cylindrical casing 13 having an axial discharge nozzle 14 at one end and an igniter opening 15 located at its opposite end adapted to receive an igniter 21. Casing 13 defines a combustion chamber 16 which is loaded with a solid propellant grain 17 of oxidizer/fuel-binder combustible composition such as ammonium perchloride-polysulfide based elastomeric materials. Propellant 17 is cast with an axial core 18 having an outer margin defining an internal-burning surface 19 and the ends of the core are communicable with igniter 21 and discharge nozzle 14, respectively. It will be understood, however, that propellant compositions and grain configurations contemplated herein are not limited to the foregoing because of the many other combinations known in the prior art.

The primary igniting system 20 includes a plurality of electrically initiated igniters 21 which are fitted into respective igniter openings 15 in igniting relation with propellant burning surface 19. Igniter 21 is of a type well known in the prior art and includes a pair of input terminals 22 and 23 and electro-explosive components housed therein. These components, not specifically shown, may include, for example, a squib or an exploding bridgewire initiator connected internally across terminals 22 and 23, and a suitable quantity of pyrotechnic material positioned adjacent the squib or similar device. Externally, all pairs of terminals 22 and 23 are connected in parallel through common conductors 24 and 25 and then to a switch controlled power source 26. Power source 26 is also well known in the prior art and is adapted to operate in response to a command signal and may be D.C. such as is provided by a battery or a charged capacitor.

Figure 2:
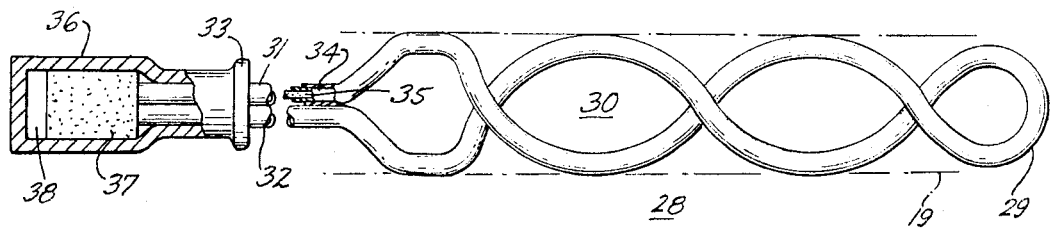
FIGURE 2 illustrates an explosive train igniter of this invention.
Figure 3:
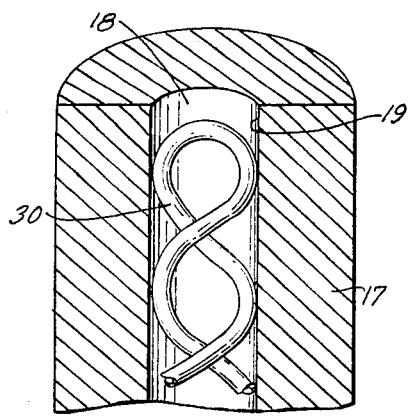
FIGURE 3 is an enlarged sectional view to show the igniter train contacting the grain in a helical path.

The secondary igniting system 27 includes a plurality of heat-initiatable explosive trains 28 arranged in series between the motors 12 to cascade them as illustrated in FIGURE 1. Referring now to FIGURE 2, each train 28 functions as an igniter and comprises of a looped length of linear explosive ignition charge 29 which has a loosely twisted igniting portion 30 intermediate juxtapositioned ends 31 and 32, and a heat-sensitive primer 33 in contact with said ends. A train 28 is provided for each pair of motors 12 and mounted by suitable supporting means, not shown, so that its primer 33 is exposed to the heat of combustion of one motor in the vicinity of its discharge nozzle 14, or elsewhere as in combustion chamber 16, and the diametrically opposite surfaces of the twisted igniting portion 31 are aligned with opposing regions of propellant burning surface 19 in another motor. Outer margins of igniting portion 30 are generally mounted adjacent propellant surface 19, or may be embedded therein, or cemented thereto, depending upon the type and quantity of linear charge 29 and character of propellant charge 17 involved. Thus, each motor 12 of the cluster has a primer 33 of one train and igniting portion 30 of another train and the plurality of trains connect the plurality of motors in series so that ignition of the propellant in one motor will be transmitted through one train to ignite the next motor, one after the other, until the propellant in all of the motors has been ignited independently of the primary ignition system to provide separate redundant ignition systems.

Referring again to FIGURE 2, linear charge 29 is exemplified by commercially available products characterized by a continuous ductile metal sheath 34 containing an explosive core composition 35 weighing from 1 to about 40 grains per foot and having a detonating velocity ranging from approximately 12,000 to about 24,000 feet per second. Explosive core material 35 is selected from either an ignition-propagation composition comprised of a mixture of crystalline high-explosive material, an oxidant and a fuel, or a detonating fuse composition such as pentaerythritol tetranitrate (PETN). The ignition-propagation composition is preferred because of its capability of generating a large cloud of hot gases and ignition particles which are especially effective in producing combustion of propellant 17. Furthermore, it has a relative detonating strength of only about one-fifth that of the detonating fuse without sacrificing ignition reliability, and in addition is less likely of damaging propellant 17. A constraining jacket over the metal sheath may be employed in the region between igniting portion 30 and primer 33 to protect the surroundings from blast effects of detonation. It is to be understood that other flexible linear charges such as explosive and pyrotechnic materials bound in an elastomeric matrix and utilized as above are also contemplated within the scope of this invention.

Still referring to FIGURE 2, primer 33 is of a well-known end-primer variety frequently comprised of a cupped thin metal shell 36 having its open end adapted to receive one or more ends of linear charge 29. Shell 36 contains a sensitive initiator compound 37 such as lead azide at its closed end and a primer compound 38 such as PETN adjacent the initiator compound. Normally, primer 33 is initiated when its closed end is struck by a shock wave, but in the present invention initiation occurs when its end is heated by products of combustion of propellant 17. Lead azide, for example, explodes in about 100 milliseconds at 390° C. and in a substantially shorter period at elevated temperatures such as are encountered when burning solid propellants.

In operation, the primary igniting system 20 is normally relied upon for igniting motors 12 and is activated in response to a command signal. This signal connects the power source 26 to deliver current through common conductors 24 and 25 simultaneously to all electrical igniters 21. The pyrotechnic materials become ignited and each produces a supply of hot gases which are directed against respective burning surfaces 19 and usually causes the ignition of propellant 17. The resulting products of combustion become pressurized while frequently exceeding a temperature of 3000° F. and flow through discharge nozzle 14 to produce axial thrust. In addition, the initial mass flow of the products of combustion through axial core 18 dislodge the linear charge 29 from its mounting and burning surface 19 and harmlessly ejects it through nozzle 14.

If, after activating primary igniting system 20, one motor 12 fails to ignite, the linear charge 29 in each unignited motor 12 remains intact, thus permitting secondary igniting system 27 to become initiated. Initiation occurs in the explosive train 28 whose primer 33 is first to be detonated by heated products of combustion of an associated motor 12, which motor may be located at any position in the cascade circuit of FIGURE 1.

Initiation of linear charge ends 31 and 32 follows detonation of primer 33 and generates redundant detonating waves which advance toward a mid-point along the looped length of linear charge 29. As a result, explosive core composition 35 is detonated and produces an igniting impulse in igniting portion 30 having two components. Normally, these components simultaneously traverse diametrically opposite sections of portion 30 and ignite companion regions of propellant burning surface 19. Thereafter, burning spreads rapidly over the remaining propellant surface 19 and ignites un-ignited motor 12, the products of which are discharged through nozzle 14. Thus, ignition occurs from a redundant source which advantageously distributes ignition stresses symmetrically about the thrust axis and induces only a minimum of blast effect on propellant 17 and other appurtenances. Single component impulses, such as from an open-loop explosive train, will also ignite propellant surface 19 but with a lesser degree of reliability.

Secondary ignition occurs within a precise time interval and is predetermined by a combination of a number of factors such as type, quantity and length of explosive components in train 28, ambient temperature of components, and temperature of heated products of combustion of ignited motor 12. The time interval begins immediately after igniting the first motor 12 by primary igniting system 20 and its precise duration for igniting a single motor may be as small as a few milliseconds or as large as 150 milliseconds. The actual igniting impulse has a shorter duration but occurs in the later portion of the time interval. When two or more unignited motors 12 are cascaded, a rapid sequence of igniting impulses is generated by secondary igniting system 27, each impulse being spaced by a substantially identical time interval as described above.

Figure 4:
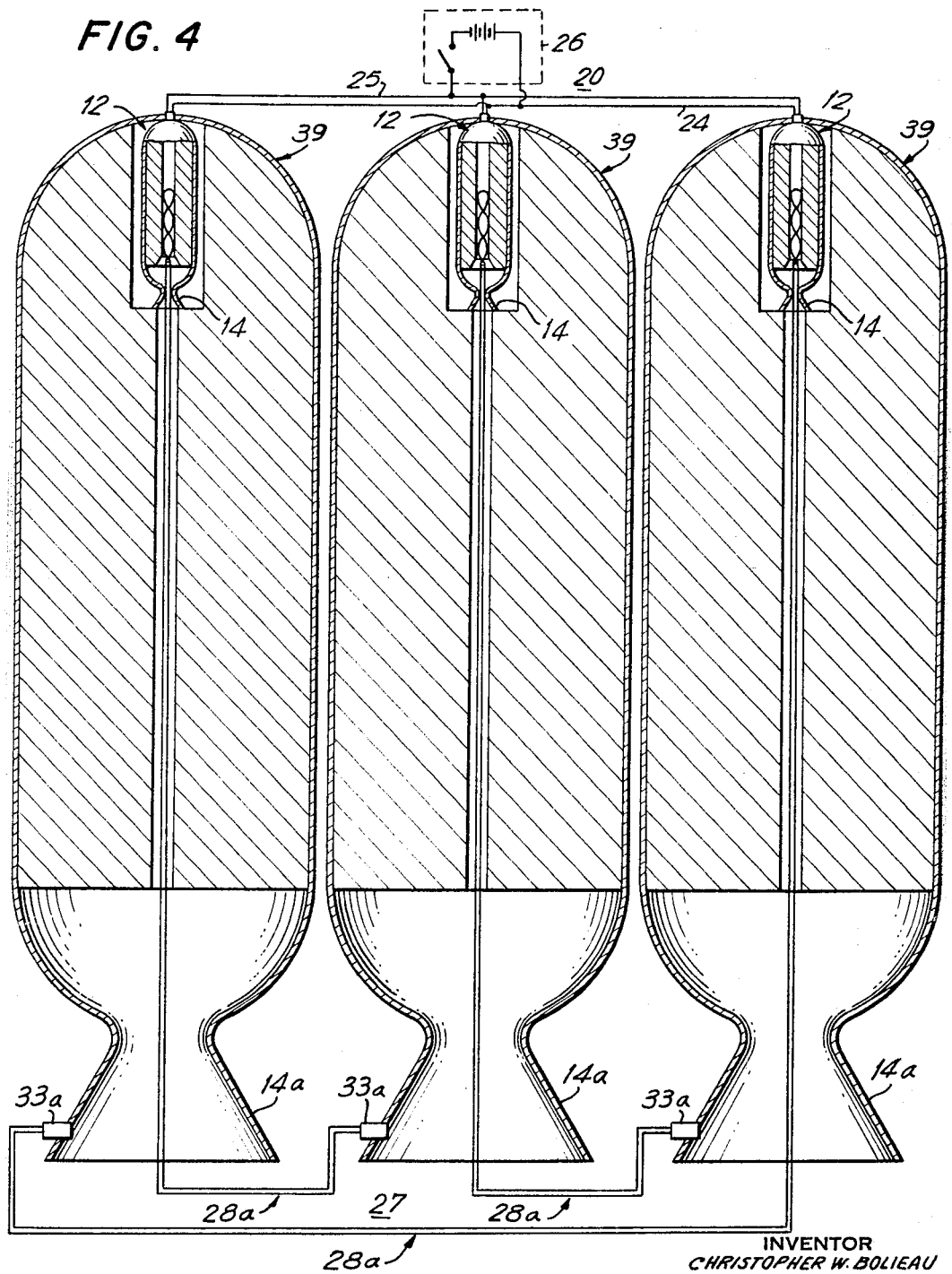
FIGURE 4 is a view similar to FIGURE 1 showing a cluster of super-rocket motors containing small rocket motors as igniters and showing the redundant ignition means of the present invention applied thereto.

Referring to the alternate construction of FIGURE 4, operation of clusters having super-rocket motors 39 includes substantially the foregoing in addition to the following. Normally, motors 12 function as the igniting means for super-motors 39 and are ignited by the primary igniting system 20 and supplemented by secondary igniting system 27. Streams of hot gases issuing from discharge nozzles 14 are directed against respective propellant burning surfaces of super motors 39, thus causing their ignition. To prevent a possible ignition failure in super motor 39, primer 33 of explosive trains 28 may be positioned to contact heated products of combustion of motors 39 instead of those of motors 12, thereby affording an even greater degree of failure detection.

Thus, the present invention provides clustered rocket motor systems with improved reliability; redundant igniting means for improving the reliability; separate and distinct primary and secondary igniting systems comprising the redundant igniting means; and said systems responding to different sources for initiation and operation. Furthermore, this invention provides clustered rocket motors with a heat-initiatable secondary igntiing system, said system igniting all motors which fail to become ignited by the primary system. Moreover, the secondary igniting system of the present invention includes explosive trains which cascade all motors in the cluster, thus allowing initiation thereof to occur at any location in the cluster; supplies a rapid sequence of igniting impulses, thereby minimizing ignition shock effects on the cluster without relying on separate time delay elements; is simple, compact and light weight in construction, and highly reliable in operation. Still further, the explosive train of the present invention provides a novel configuration which in itself is redundant without increasing substantially the explosive blast effects on its associated ignitable surfaces.

It will be understood that various changes may be made in the construction and arrangement of the elements as herein described and illustrated without departing from the spirit or scope of the invention, the extent of such changes being limited only by the scope of the invention which is defined in the appended claims.

What is claimed is:

1. An ignition system for a cluster of rocket motors of the type containing a solid propellant grain comprising a primary igniting means for igniting the propellant grains in the plurality of motors simultaneously in response to a command signal, said primary igniting means including an element in each rocket motor adjacent its propellant grain which contains a pyrotechnic material and an electric igniter connected to the plurality of elements, a secondary igniting means including linear explosive type igniter trains for igniting one or more motors which fail to become ignited by the primary igniting means, and each of said igniter trains including an igniting portion adjacent the propellant grain in one of said motors and a heat operated primer located to respond to heat from another motor to initiate operation of the train.

2. An ignition system according to claim 1 wherein the plurality of linear explosive type igniter trains are connected to the motors in a cascade circuit for providing a rapid sequence of igniting impulses, and each of said igniter trains being connected between a different pair of motors in the cluster and adapted to respond instantly to the initial heat of combustion of an ignited motor in said pair of motors.

3. An ignition system according to claim 2 wherein the igniter trains are connected in a closed-loop cascade circuit thereby allowing the rapid sequence of igniting impulses to be initiated at any location in the cluster by the motor first to become ignited by the primary igniting means.

4. An ignition system according to claim 1 wherein each igniter train is in the form of a loop of the linear explosive charge disposed contiguous a burning surface of said propellant, and the ends of the loop being connected to the heat operated primer.

5. A redundant ignition system for a cluster of solid propellant rocket motors comprising primary igniting means for normally igniting the motors in response to a command signal, a secondary igniting means for improving the reliability of igniting said motors, said secondary igniting means including a plurality of linear explosive type igniter trains adjacent the solid propellant for the plurality of motors for igniting one or more motors which fail to become ignited by the primary igniting means, and each of said igniter trains having a heat sensitive primer disposed communicatively with a different motor in the cluster and adapted to respond instantly to heat from said motor.

6. The combination with a solid propellant grain of a rocket motor having a longitudinally extending central opening to provide an internal-burning surface of an ignition means for igniting the propellant in response to a command signal comprising an igniter train having detonating means joined to a linear explosive charge, said linear explosive charge of the igniter train having a looped igniting portion disposed contiguous to the internal burning surface and twisted in spaced helical coils along the longitudinally extending central opening to adapt it to ignite the propellant along diametrically opposite helical paths on the surface and to cause self-ignition of the region therebetween, and at least one of the ends of the looped igniting portion of the linear explosive charge extending to a location remote from the propellant grain and connected to the detonating means.

7. A combination according to claim 6 wherein the igniter train detonating means is heat responsive to detonate the explosive charge.

8. A combination according to claim 6 in which both ends of the looped igniting portion are joined to each other and the same detonating means whereby both sides of the loop produce impulses which simultaneously traverse the diametrically opposed helical paths to thereby improve the speed and reliability of igniting said propellant and also distribute the ignition symmetrically about a central axis of said propellant grain.

9. An ignition system for a cluster of super-rocket motors, each super-rocket motor having a combustion chamber loaded with a solid propellant grain; at least one small solid propellant rocket motor disposed within each super-rocket motor and adapted to ignite the propellant therein when ignited, primary igniting means for normally igniting the plurality of small rocket motors in response to a command signal and including an igniting element adjacent the grain in each motor and an electric igniter connected to the plurality of elements, and secondary igniting means for improving the reliability of igniting the small rocket motors, said secondary igniting means including a plurality of linear explosive type igniter trains for igniting any small motor which fails to become ignited by the primary means, each of said igniter trains having a portion adjacent the grain of one small motor in a super-rocket motor and a heat sensitive primer located adjacent another super-rocket motor of the cluster, and each train being disposed communicatively between a different pair of the super-rocket motors.

10. An ignition system according to claim 9 wherein each igniter train is disposed between different pairs of rocket motors each comprised of a super-rocket motor and a small rocket-motor and adapted to respond instantly to the initial heat of combustion of the super-rocket motor in an adjacent pair of motors.

11. An ignition system according to claim 9 wherein each igniter train is comprised of a loop of the linear explosive train having a twisted portion contiguous the propellant to be ignited with the ends of the loop connected to the primer to ignite both ends of the loop simultaneously.

References Cited by the Examiner
UNITED STATES PATENTS

| 3,021,785 | 2/1962 | Hradel et al. | 102—70 X |
| 3,037,453 | 6/1962 | Cook et al. | 102—27 |
| 3,069,844 | 12/1962 | Bearer | 60—39.82 X |

MARK NEWMAN, *Primary Examiner.*

CARLTON R. CROYLE, *Examiner.*